US010709005B2

(12) United States Patent
Chen et al.

(10) Patent No.: US 10,709,005 B2
(45) Date of Patent: Jul. 7, 2020

(54) PLASMA TORCH ELECTRODE WITH INTEGRATED HEAT PIPES

(71) Applicant: Institute of Nuclear Energy Research, Atomic Energy Council, Executive Yuan, R.O.C., Taoyuan (TW)

(72) Inventors: Shiaw-Huei Chen, New Taipei (TW); How-Ming Lee, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 190 days.

(21) Appl. No.: 15/969,916

(22) Filed: May 3, 2018

(65) Prior Publication Data

US 2019/0342986 A1 Nov. 7, 2019

(51) Int. Cl.

| | |
|---|---|
| ***B23K 10/00*** | (2006.01) |
| ***H05H 1/28*** | (2006.01) |
| ***F28D 15/04*** | (2006.01) |
| ***F28D 15/02*** | (2006.01) |

(52) U.S. Cl.

CPC .......... *H05H 1/28* (2013.01); *F28D 15/0275* (2013.01); *F28D 15/04* (2013.01)

(58) Field of Classification Search

CPC ... H05H 1/28; H05H 1/34; H95H 1/26; B23K 10/00; F28D 15/0275; F24D 15/04

USPC ....... 219/121.49, 121.39, 121.48, 121.52, 75

See application file for complete search history.

(56) References Cited

U.S. PATENT DOCUMENTS

| | | | | |
|---|---|---|---|---|
| 2,336,764 | A * | 12/1943 | Abbott | F04F 9/00 417/154 |
| 2,853,953 | A * | 9/1958 | Hallman | F22B 1/30 417/208 |
| 10,181,406 | B2 * | 1/2019 | Okumura | H01J 37/321 |
| 2008/0093962 | A1 * | 4/2008 | Kim | F28D 15/02 313/46 |
| 2014/0312761 | A1 * | 10/2014 | Tamagaki | C23C 14/3407 313/34 |

* cited by examiner

*Primary Examiner* — Mark H Paschall

(74) *Attorney, Agent, or Firm* — Demian K. Jackson; Jackson IPG PLLC

(57) ABSTRACT

Plasma torch with an integrated electrode incorporating many heat pipes each heat pipe comprises an evaporating section and a condensing section set at a front end and a rear end of the electrode, respectively. The heat pipes with extremely high thermal conductivity can be used to replace the traditional water-cooled torch's electrode. The effect of reducing the elevated temperature at the torch's arc root zone through cooling by heat pipes is beneficial for prolonging the lifetime of plasma torch. Each heat pipe is filled with a small amount of working fluid. Even if one heat pipe is etched out, the cooling liquid thus ejected is limited without causing gas explosion and rock curing; the rest of heat pipes are not damage and can still function; although the heat dissipation efficiency might be reduced a little, the plasma torch still works. Thus, flexibility of the whole heat dissipation is enhanced.

7 Claims, 5 Drawing Sheets

PLASMA TORCH ELECTRODE WITH INTEGRATED HEAT PIPES

TECHNICAL FIELD OF THE INVENTION

The present invention relates to a method of improving heat dissipation of a plasma torch electrode; more particularly, to applying heat pipes circularly inside the plasma torch electrode to achieve high-efficiency heat dissipation, where each one of the heat pipes comprises an evaporating section at a front end and a condensing section at a rear end; and the heat pipes for the cooling for torch electrode have the merit of very high thermal conductivity so that the traditional water-flow cooled electrode with passage can be replaced with the effect of a lowered temperature at the center of arc root, thus enhanced heat dissipation efficiency, reduced electrode corrosion, prolonged lifetime for plasma torch, lengthened service cycle, and further lowered the cost of maintenance.

DESCRIPTION OF THE RELATED ARTS

Plasma Torches for high temperature applications is a core technology relied heavily on power electronic equipment and auxiliary system. One main trend is the adoption of direct-current (DC) plasma torch with merits on high efficiency and low cost. Most of the world's plasma melting systems have adopted DC plasma torches. DC plasma torch is a form of controlled gas arc discharge—a self-sustaining arc discharge with a working pressure usually greater than the atmospheric pressure in most cases. A DC plasma torch with an operating power reaching 10~8,000 kilowatts (kW) can generate a jet flame with a high center temperature about 5,000~30,000° C., and a flame having an energy density about 10~100 mega-joules per kilogram (MJ/kg). The physical size of arc root that originates from the surface of torch electrode is increased with the operating power of the plasma torch, and the diameter of arc root size mainly falls in the range around 1~6 mm. Because about some portion of the main power of the torch falls on this small spot, usually the temperature at the arc spot is higher than the melting and boiling point of the electrode material, then part of the electrode material will be melted and evaporated due to this high temperature, and the metal particles evaporated further carry away with the working gas flow, which enhances and shortens the lifetime of the plasma torch and becomes the main obstacle that limits the applications of this technology. Many improvement methods and techniques are studied and tried, for example, a magnetic field or a variable working airflow is used to guide and forced the movement of the arc root for preventing the arc root from being fixed at the same region of the electrode which would cause the electrode to be severely eroded in a short time, but usually this kind of improvement would cause the power fluctuation of the working torch. Another method is to enhance the heat dissipation effect of the electrode with high-efficient, such as the designs of pressurized cooling-water and heat-dissipating channels and fins around the torch's electrode which used cooling-water channels for the high-pressure water located outside the electrode of the torch, but this also has its limits due to the maximum thermal conductivity that can be achieved. In most cases, the metallic copper is often used as the construction material for the electrode of a well-type plasma torch, and the reason is not only owing to copper's cheap cost but also to the high electric and thermal conductivity both. For the physical properties of copper, it has a melting point at 1083° C. and a boiling point at 2567° C., thermal conductivity around 400 W/(m·K). By referring to documents concerning the erosion of DC plasma torch, it is found that the minimum loss of copper electrode is about $10^{-7}$ grams/coulomb for the traditional cooling method uses high-pressure water to cool the copper electrode of the torch down. But, in practical applications one problem occurred, a plasma melting furnace can be taken as an example for that, once the torch electrode is etched out with a small leak hole, high-pressured water that flows in the traditional cooling channels will be ejected into the plasma melting furnace in a great amount instantly. Because the plasma melting furnace is often work and maintained at a high temperature, for example, above 1200° C., the ejected cooling water will be instantly gasified with gas volume increased suddenly. There had a great opportunity of causing internal gas explosion which is not wanted in any case. At the same time, the outflow of the cooling water also causes the to-be-treated molten liquid already existed in the plasma furnace to be cooled down suddenly and solidified instantly, which forms a major problem in the subsequent repair and re-operation of the plasma furnace. Hence, the prior arts do not fulfill all users' requests on actual usage.

SUMMARY OF THE INVENTION

The main purpose of the present invention is to replace the traditional water-cooled torch's electrode by incorporate heat pipes with extremely high thermal conductivity into the torch electrode to further enhance the capability of high efficient heat dissipation, thus to achieve a lowered temperature at the center of arc root, thus reduced electrode corrosion, prolonged lifetime for plasma torch, lengthened service cycle, and further lowered the cost of maintenance.

Another purpose of the present invention is to provide an integrated structure of a plasma torch electrode with heat pipes inside for obtaining an effect of high heat dissipation, where the heat pipes are made by three-dimensional (3D) metal-printing machine directly; or through drill the electrode into deep directly; or through drilled the electrode to obtain channels buried with the heat pipes separately.

Another feature of the present invention is the ability to avoid and solve gas explosion and rock curing once the torch electrode is etched out with cooling liquid ejected, which is a common problem encountered during the usage of plasma torch in any system.

Another feature of the present invention is due to the possibility of arranging more than one heat pipe circularly in the torch electrode, so that even when one of the heat pipes is etched out, as there is only few water inside the heat pipe, the gas explosion can be avoided, as a whole the torch electrode still remains in good working condition for heat dissipation although it might be deteriorated a little bit, but this would trigger an alarm and also left enough time for the operator to execute the follow-up shut down procedure for preventing gas explosion dangers and thus benefiting both safety and maintenance for the instrument and operator.

To achieve the above purposes, the present invention is a method of high-efficient heat dissipation for a plasma torch electrode by adopting integrated heat pipes, where a torch electrode is formed as an integrated structure having a plurality of heat pipes arranged circularly without interface; for the heat pipes inside the torch electrode, each one of the heat pipes comprises an evaporating section at a front end and a condensing section at a rear end; a water-cooled electrode is replaced by using the heat pipes having thermal conductivity of 5,000~50,000 watts per meter per kelvin (W/m·K) so that the torch electrode has a lowered temperature of arc root, electrode corrosion is hindered, and heat dissipation efficiency is enhanced; as only a small and limited amount of a working fluid is filled into each one of the heat pipes so that the case of gas explosion and rock curing are avoided and solved when the torch electrode is erosion and etched out from inner surface of the electrode and reached the heat pipe; and, even though one of the heat pipes is etched out, the heat pipes as a whole remains good heat dissipation and enable enough response time to process follow-up treatment. Accordingly, a novel method of high-efficiency heat dissipation for a plasma torch electrode by using integrated heat pipes is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1~FIG. 5, which are a view showing a torch electrode using a preferred embodiment according to the present invention; a view showing a curve of temperature distribution at axial direction on surface of an evaporating section; and views showing in 3D the temperature distributions of a torch electrode without heat pipes, and torch electrodes with heat pipes having thermal conductivity of 5,000 W/(m·K) and the best theoretical value 50,000 W/(m·K). As shown in the figures, the present invention is a method of high-efficient heat dissipation for a plasma torch electrode by using integrated heat pipes. The method uses heat pipes having ultra-high thermal conductivity to replace the existing water-cooled electrode which is still commonly adopted. According to the present invention, the heat pipes have better heat dissipation efficiency with super high thermal conductivity of 5,000~50,000 W/(m·K); the temperature of arc root of the torch electrode is reduced and slowed down electrode erosion process•thus increase the lifetime of the torch electrode; and the maintenance cycle of the torch is extended with cost reduced by this technology promotion. To judge whether a device has a good thermal conductivity, it will depend on the conductivity of the materials or the cooling scheme built inside. In general, the thermal conductivity of materials decrease from those physical phases of solids, liquids, gases, and the vacuum condition is the worst. For example, air has the thermal conductivity of 0.024 W/(m·K); water, 0.58 W/(m·K) at 4° C.; carbon steel, 43.2 W/(m·K); and copper, 400 W/(m·K). The thermal conductivity of the heat pipes are 5,000~10,000 W/(m·K), which depends on the factors such as building material, working fluid, environment, etc.

Figure 1:
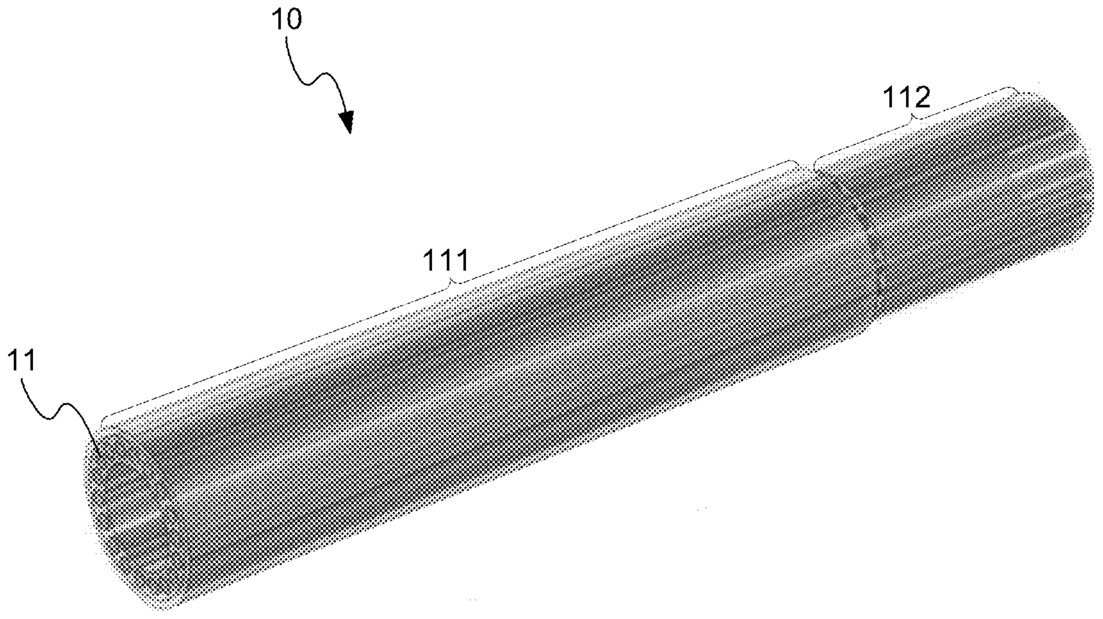
FIG. 1 is the view showing the torch electrode using the preferred embodiment according to the present invention.
Figure 2:
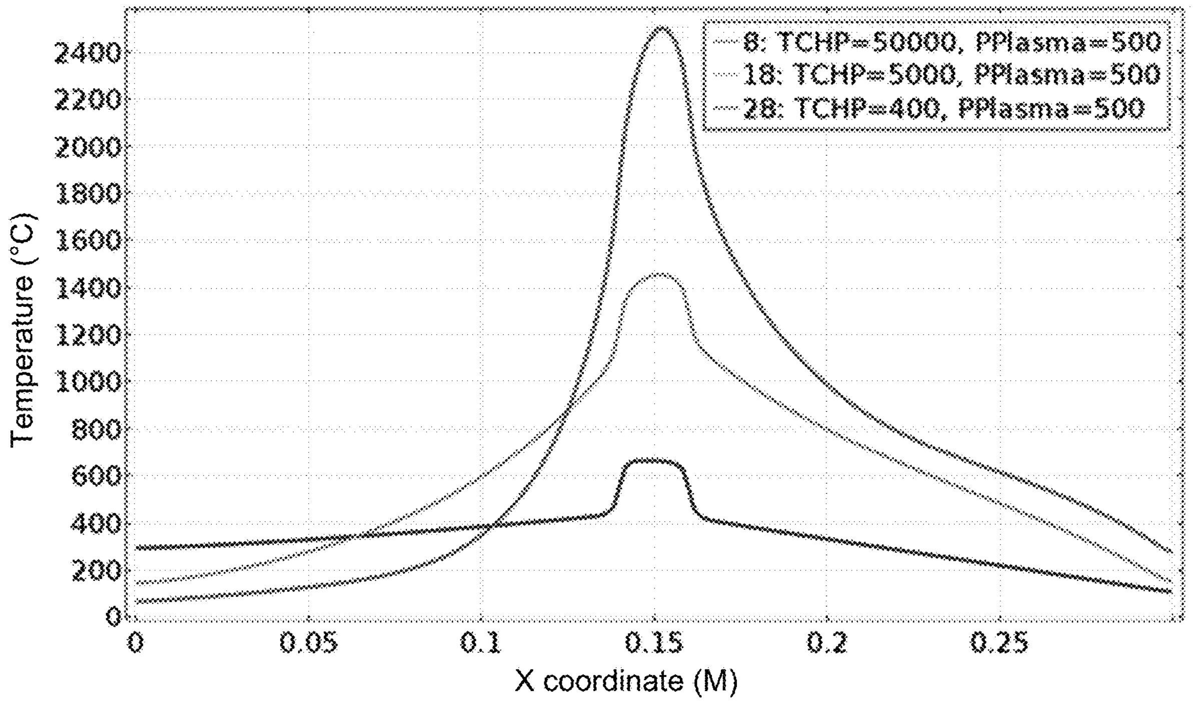
FIG. 2 is the view showing the curve of temperature distribution at the axial direction on the electrode surface of the evaporating section.

A preferred embodiment is applied to a well-type direct-current (DC) plasma torch with hollow electrode. As an example. In FIG. 1, a plurality of heat pipes 11 is integrated inside a rear electrode (i.e. an electrically-connected copper cathode having negative polarity), and is suitable to be used in a well-type DC torch 10. The heat pipes 11 are directly made inside the torch electrode 10 through 3D metal-printing machine and can be arranged circularly to form an integrated structure with the same metal material such as copper without interface. An evaporating section 111 of each one of the heat pipes 11 is set for about 30 centimeters (cm), for example in the drawing, at a front end inside the torch electrode 10; the evaporating section 111 has a center at this center of a plasma arc root; and a condensing section 112, which is shorter than the evaporating section 111, is set for about 10 cm, for example in this drawing, at a rear end inside the torch electrode 10. A simulation of computational fluid dynamics (CFD) was performed with the geometrical model of this 3D electrode to demonstrate the invention, as an example. In this simulation, the value of thermal conductivity of the integrated electrode with heat pipes inside was changed from 400 W/(m·K), 5,000 W/(m·K) and 50,000 W/(m·K), and simulation was performed in three cases. Therein, 400 W/(m·K) is to represent the thermal conductivity of copper, and 5,000 W/(m·K) and 50,000 W/(m·K) are the upper and lower limits of the thermal conductivity of the heat pipes, respectively, which were used as reference values. The plasma torch is assumed to operate at a power of 500 kW, and the arc root is assumed to move along an inner surface of the electrode that formed a belt region with a length of 1.5 cm at center of this hollow electrode, which is a common value for a DC plasma operated at constant current mode. FIG. 2 shows a distribution curve of temperature on the surface of the axial direction of the torch electrode at the evaporating section. For the central arc-root zone, the maximum temperature there can be reached is 2500° C. when the value of thermal conductivity is set at 400 W/(m·K), this also corresponds the exact situation encountered in real case the electrode without water cooled copper; and nearly 1500° C. when the thermal conductivity is 5,000 W/(m·K); and approximately 700° C. when the thermal conductivity is 50,000 W/(m·K).

Figure 3:
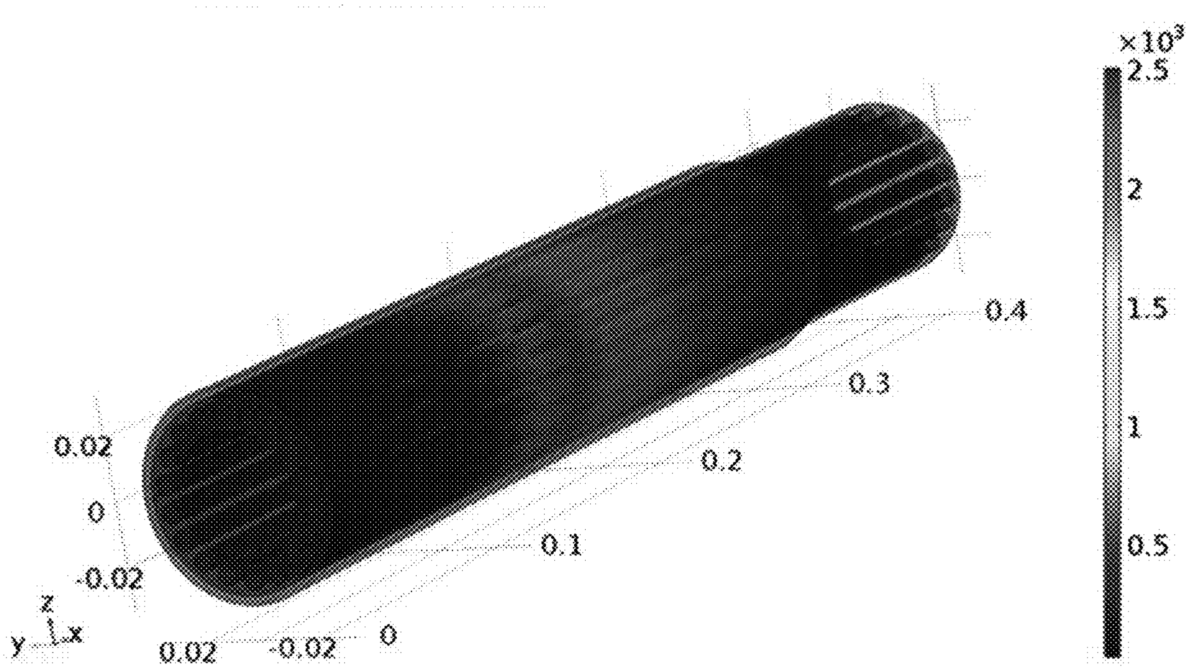
FIG. 3 is the three-dimensional (3D) view showing the temperature distribution of the torch electrode without heat pipes.
Figure 4:
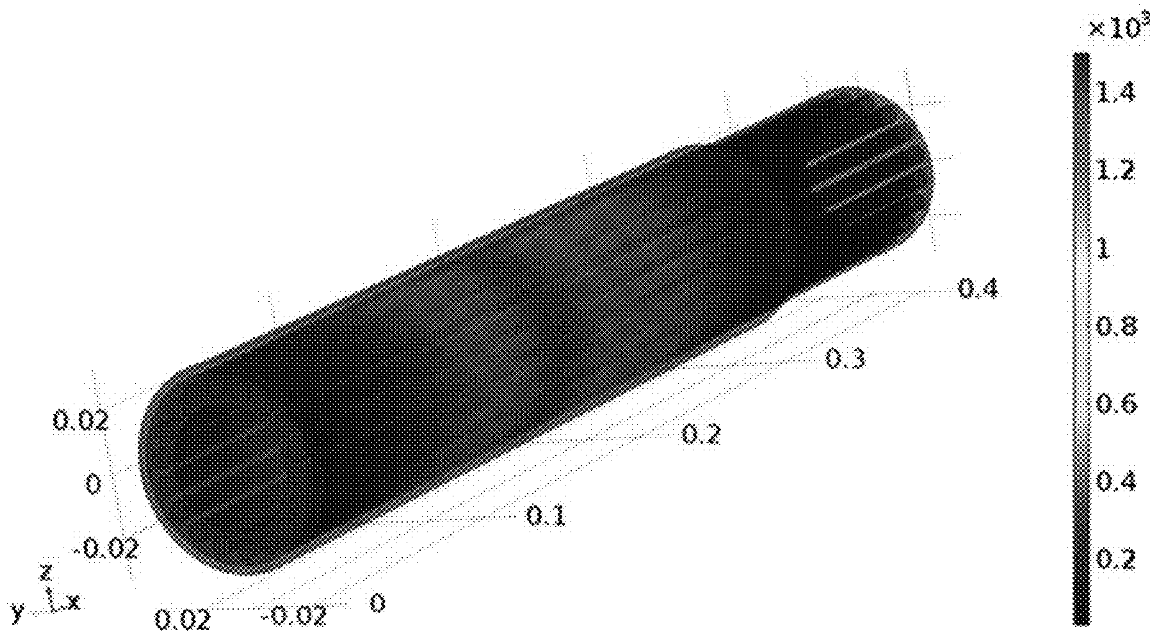
FIG. 4 is the 3D view showing the temperature distribution of the torch electrode with the heat pipes having thermal conductivity of 5,000 watts per meter per kelvin (W/m·K)
Figure 5:
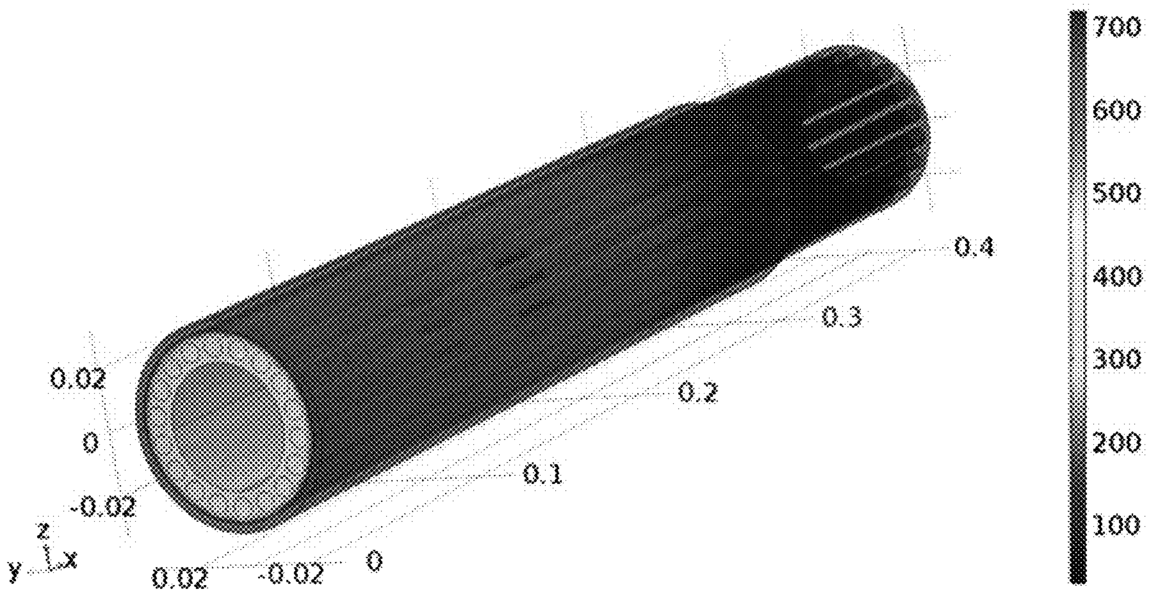
FIG. 5 is the 3D view showing the temperature distribution of the torch electrode with the heat pipes having thermal conductivity of 50,000 W/(m·K).

Since copper has a melting point of 1083° C. and a boiling point of 2567° C. When heat pipes are not applied, which is exactly the case for copper having the thermal conductivity of 400 W/(m·K), the copper electrode will be hard to avoid erosion even though the maximum temperature is just a little below the boiling point. And this is the actual situation observed why the erosion of the plasma torch can not be eliminated completely. As compared to the case of applying integrated heat pipes having thermal conductivity of 50,000 W/(m·K), the maximum temperature on the surface of the electrode is lower than 700° C., which is much lower than the melting point perfect for avoiding electrode erosion. But as mentioned earlier this value is maximum theoretical value, not possible to realize it in real world. When the thermal conductivity is set 5,000 W/(m·K) (which is quite close to the actual thermal conductivity of the heat pipes), the high-temperature at the arc-root zone has a temperature lower than the boiling point but higher than the melting point of copper. If compared to the case for 400 W/(m·K), though the copper melting can't be avoided but no gasification occurs, thus electrode erosion is greatly hindered if the arc zone temperature is reduced below boiling point of copper; and the lifetime of the torch electrode is prolonged. FIG. 3, FIG. 4 and FIG. 5 show the 3D temperature distributions of the torch electrode obtained through the CFD simulation under the three cases of heat pipe thermal conductivity (TCHP) of 400 W/(m·K), 5,000 W/(m·K) and 50,000 W/(m·K), respectively. The temperature distributions comprise those of the evaporating section and the condensing section.

For applying the present invention, where the existing method of 3D metal-printing is used for directly forming the integrated well-type DC plasma hollow torch electrode with the heat pipes and after filling the working fluid at the tail end the heat pipes are vacuum-sealed. The integrated structure with the heat pipes thus obtained has no interface and no contact thermal loss with better cooling effect. Or, the heat pipes can also be directly made through deep drilling with the heat pipes are vacuum-sealed follow after filling the working fluid at the tail end. Or, the heat pipes can be buried into long channels formed by drilling through electrode of the cathode. But, the above methods of deep drilling and heat pipes buried have difficult in tight adhesion, the thermal conductivity will be slightly decreased. Moreover, a wick structure can also be easily added to the heat pipes in the present invention, and this permits the torch to work both in a vertical or a horizontal position.

The present invention has another advantage. Since the working fluid filled in the heat pipes generally occupies a small and limited volume of 10~50%, when the torch electrode is etched out it would not eject out a large amount of the cooling liquid if compared to the conventional high-pressure water cooling channels scheme, which might also cause gas explosion and rock curing to the melted liquid in a typical plasma furnace. Furthermore, the heat pipes integrated to the torch electrode for high-efficiency heat dissipation are multiple tubes and can be arranged into a staggered matrix formation. The situation of the so-called erosion encountered in the integrated torch electrode with multiple heat pipes inside is that one of the heat pipes is etched out first and then leak the working fluid•yet the remaining heat pipes are still working. As a whole, the function of heat dissipation of the plasma electrode is still working with little deterioration only. This leaves proper responding time for the operator for the follow-up shutdown treatment to prevent danger and ensure safety.

To sum up, the present invention is a method of high-efficient heat dissipation for an integrated plasma torch electrode by using heat pipes, where, since plasma torch is the core technology of a high-temperature plasma furnace, the present invention redesigns an electrode with heat dissipation highly enhanced for prolonging the lifetime of the plasma torch; the maintenance cycle is effectively extended; thus the operational cost of a plasma furnace is reduced and improved; and the rate of investment is increased for the manufacturer.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An integrated plasma torch electrode having a plurality of integrated heat pipes arranged circularly without interface; wherein, inside said torch electrode, each one of said heat pipes comprises an evaporating section at a first end and a condensing section at a second end opposite to said first end; wherein the heat pipes have a thermal conductivity of 5,00050,000 watts meter-Kelvin (W/(m·K)); wherein a working fluid is filled into each one of said heat pipes.

2. The integrated plasma torch electrode of claim 1, wherein said heat pipes are 3D metal-printed; and wherein said working fluid is filled into each one of said heat pipes from the first or second end and afterwards, the heat pipes are vacuum-sealed.

3. The integrated plasma torch electrode of claim 1, wherein said torch electrode is drilled to obtain said heat pipes directly; and wherein said working fluid is filled into each one of said heat pipes from the first or second end and, afterwards, the heat pipes are vacuum-sealed.

4. The integrated plasma torch electrode of claim 1, wherein said torch electrode is drilled to obtain channels and wherein said heat pipes are then separately buried in the drilled channels.

5. The integrated plasma torch electrode of claim 1, wherein said torch electrode is a rear electrode of a well-type direct-current plasma hollow torch.

6. The integrated plasma torch electrode of claim 1, wherein said working fluid occupies a volume of each one of said heat pipes at 10~50 percents.

7. The integrated plasma torch electrode of claim 1, further comprising a wick structure added to each one of said heat pipes.

* * * * *